(12) United States Patent
Ito

(10) Patent No.: US 10,959,896 B2
(45) Date of Patent: Mar. 30, 2021

(54) MEDICAL CART

(71) Applicant: TAKETOMO, INC., Tokyo (JP)

(72) Inventor: Hiroaki Ito, Tokyo (JP)

(73) Assignee: TAKETOMO, INC.

( * ) Notice: Subject to any disclaimer, the term of this patent is extended or adjusted under 35 U.S.C. 154(b) by 0 days.

(21) Appl. No.: 16/628,864

(22) PCT Filed: Mar. 29, 2018

(86) PCT No.: PCT/JP2018/013169
§ 371 (c)(1),
(2) Date: Jan. 6, 2020

(87) PCT Pub. No.: WO2019/044017
PCT Pub. Date: Mar. 7, 2019

(65) Prior Publication Data
US 2020/0222261 A1   Jul. 16, 2020

(30) Foreign Application Priority Data

Aug. 31, 2017 (JP) .............................. JP2017-167647

(51) Int. Cl.
| | |
|---|---|
| *A61C 19/02* | (2006.01) |
| *A61G 12/00* | (2006.01) |
| *B62B 3/00* | (2006.01) |
| *G01K 1/02* | (2021.01) |
| *G06K 19/07* | (2006.01) |

(Continued)

(52) U.S. Cl.
CPC .............. *A61G 12/001* (2013.01); *B62B 3/00* (2013.01); *G01K 1/02* (2013.01); *G06K 19/0728* (2013.01); *G06K 19/07705* (2013.01); *H01Q 1/2208* (2013.01)

(58) Field of Classification Search
CPC ............ A61G 12/001; G06K 19/0728; G06K 19/07705; H01Q 1/2208; B62B 3/00
See application file for complete search history.

(56) References Cited

U.S. PATENT DOCUMENTS

| | | | |
|---|---|---|---|
| 5,797,515 A * | 8/1998 | Liff ......................... | G16H 20/13 221/2 |
| 6,116,461 A * | 9/2000 | Broadfield ........... | A61G 12/001 206/443 |

(Continued)

FOREIGN PATENT DOCUMENTS

| | | |
|---|---|---|
| JP | H09-330492 A | 12/1997 |
| JP | H10-134899 A | 5/1998 |

(Continued)

*Primary Examiner* — Matthew W Ing
(74) *Attorney, Agent, or Firm* — Harness, Dickey & Pierce, P.L.C.

(57) ABSTRACT

A medical cart is provided that allows confirmation that individual medicines have been managed at appropriate temperatures. The medical cart includes: shelves on which medicines can be placed; and a control part which communicates with an RF tag provided for each of the medicines and equipped with a temperature sensor, at appropriate time intervals via an antenna part provided in the vicinity of each of the shelves, and the control part has a memory part which stores ID information of the RF tag and temperature information sensed by a temperature sensor of the RF tag.

8 Claims, 4 Drawing Sheets

(51) Int. Cl.
*G06K 19/077* (2006.01)
*H01Q 1/22* (2006.01)

(56) References Cited

U.S. PATENT DOCUMENTS

| | | | |
|---|---|---|---|
| 6,176,392 B1* | 1/2001 | William | G07F 11/165 |
| | | | 221/109 |
| 6,785,589 B2* | 8/2004 | Eggenberger | G07F 17/0092 |
| | | | 700/231 |
| 9,340,288 B2* | 5/2016 | Vandyke | F25D 3/125 |
| 9,546,810 B2* | 1/2017 | Vandyke | F25D 3/125 |
| 2005/0193760 A1* | 9/2005 | Moran | F25D 23/063 |
| | | | 62/371 |
| 2009/0044547 A1* | 2/2009 | Oswald | F25D 17/06 |
| | | | 62/89 |
| 2011/0277489 A1* | 11/2011 | Schalla | F25D 3/06 |
| | | | 62/89 |
| 2014/0261058 A1* | 9/2014 | Henderson | A61G 12/001 |
| | | | 104/288 |

FOREIGN PATENT DOCUMENTS

| | | |
|---|---|---|
| JP | 2002-267313 A | 9/2002 |
| JP | 2005-040373 A | 2/2005 |
| JP | 2007-094942 A | 4/2007 |
| JP | 2009-050076 A | 3/2009 |
| JP | 2011-235997 A | 11/2011 |
| JP | 2013-130991 A | 7/2013 |
| JP | 2015-110481 A | 6/2015 |
| JP | 2015-202918 A | 11/2015 |
| JP | 2016-204094 A | 12/2016 |
| JP | 2017-065836 A | 4/2017 |

\* cited by examiner

| Medical Card ID: 0001 | | | | | | | |
|---|---|---|---|---|---|---|---|
| | ID Information | Time | | | | | |
| | | 12:20 | 12:30 | 12:40 | 12:50 | 13:00 | ... |
| First Stage | | | | | | | |
| Second Stage | 0000000000000003 | -- | 5.2 | 5.5 | 6.0 | 6.3 | |
| Third Stage | 0000000000000001 | -- | 5.0 | 5.3 | 5.8 | 6.8 | |
| | 0000000000000002 | -- | 5.1 | 5.2 | 6.0 | 7.0 | |

MEDICAL CART

CROSS-REFERENCE TO RELATED APPLICATIONS

This application is a U.S. National Phase Application of International Application No. PCT/JP2018/013169, filed on Mar. 29, 2018 and published in Japanese as WO 2019/044017 A1 on Mar. 7, 2019 which is based on and claims the benefit of priority from Japanese Patent Application No. 2017-167647, filed on Aug. 31, 2017. The entire disclosures of all of the above applications are incorporated herein by reference.

BACKGROUND

Technical Field

The present invention relates to a medical cart on which medicines, medical apparatuses, and the like can be placed and allows the medicines, medical apparatuses, and the like to be conveyed in a medical institution such as a hospital.

Related Art

Unless appropriate temperature control for medicines, food and beverages, and the like is conducted, quality deterioration may be caused and disposal thereof may also be forced.

Therefore, developed is a food monitoring device which includes: a history meter capable of detecting a history of chronological temperature variation of food targeted for monitoring and wirelessly transmitting detected data pertinent to the history; and data processors receiving the detected data transmitted from the history meter and monitoring a state of the food targeted for monitoring based on the detected data, and the food monitoring device can monitor a history of temperature variation of frozen foods or the like in real time and accurately transmit monitored data (refer to Japanese Patent Laid-Open No. 9-330492).

In addition, developed is a baggage temperature management device for individually managing temperatures of a plurality of pieces of baggage to be delivered, which includes: temperature detecting means for detecting a temperature of each of the pieces of baggage; storage information storing means for storing storage information showing a storage temperature range for each of the pieces of the baggage; determining means for determining whether or not the temperature detected by the temperature detecting means is out of the storage temperature range shown by the storage information stored by the storage information storing means; alarm information generating means for generating alarm information, when the determining means determines that the temperature is out of the storage temperature range, in order to issue an alarm for an abnormal temperature of the piece of baggage, which corresponds to the determination; and alarm means for issuing the alarm based on the alarm information generated by the alarm information generating means, and the baggage temperature management device can individually manage the temperature of each of the pieces of baggage to be delivered (refer to Japanese Patent Laid-Open No. 2002-267313).

Furthermore, developed is an article temperature management apparatus for managing a temperature of an article with an identification medium recording an article ID attached, to be transported via a plurality of locations attached with location IDs, which includes: a communication processing unit communicably connected to a transport history information storage unit for storing transport history information in which each transport history of the article ID is associated with the location ID and to a location-temperature history information storage unit for storing location-temperature history information in which a temporal change of a location-temperature in each of the plurality of locations is associated with each of the location IDs; a transport history acquisition unit for acquiring, from the transport history information storage unit, the transport history information of a management-targeted article ID, which is an article ID of a management-targeted article, via the communication processing unit; a location-temperature history acquisition unit for acquiring, from the location-temperature history information storage unit, location-temperature history information of a location ID included in the transport history information acquired by the transport history acquisition unit via the communication processing unit; and an article temperature history generating unit for generating article temperature history information providing a temperature history of the management-targeted article upon being transported based on the location-temperature history information acquired by the location-temperature history acquisition unit, and the article temperature management apparatus can acquire the temperature history information of the article with a simplified configuration (refer to Japanese Patent Laid-Open No. 2015-202918).

Moreover, developed is a temperature control apparatus provided in a storage box for storing an article to be subjected to temperature management, which includes: an article ID memory section for storing an article ID for identifying the article; a temperature control section for detecting an ambient temperature of the article in the storage box at a constant cycle by a temperature sensor and generating temperature data including the ambient temperature, the article ID, and a measurement time; a set temperature condition memory section for storing an upper limit value and a lower limit value of the ambient temperature as set temperature conditions; a temperature abnormality determination section for comparing the ambient temperature included in the temperature data with the set temperature conditions and determining whether or not there is temperature abnormality; an elapsed time measuring section for measuring an elapsed time after the article is taken out from the storage box based on a door opening/closing operation of the storage box or a detection result of a tag attached to the article ID; a setting time condition storing section for storing an upper limit value of the elapsed time as a set time condition; a time abnormality determination section for comparing the elapsed time with the set time condition and determining presence or absence of occurrence of time abnormality; and a display section for displaying status information showing presence or absence of occurrence of abnormality relating to the article in accordance with determination results of the temperature abnormality determination section and the time abnormality determination section and the temperature data in real time, and the temperature control apparatus manages the ambient temperature of the article and a transshipping work time on an article-by-article basis and prevents quality deterioration of the article due to a temperature change (refer to Japanese Patent Laid-Open No. 2016-204094).

As described above, in order to ensure safety of quality of the medicines, the food and beverages, and the like, apparatuses, each of which can appropriately manage the temperature and confirm that the medicines, the food and beverages, and the like are not in an environment in which the quality deterioration is caused, have been developed.

However, among the medicines, a medicine for rare diseases (orphan drug) or the like has low demand and is expensive, and thus, once such medicine is distributed to a medical institution or the like, return of the medicine cannot be accepted without assurance that the medicine has been managed at an appropriate temperature and stored. In particular, when in the hospital or the like, the medicine is conveyed from a refrigerator, a freezer, or the like to a sickroom, it is impossible to confirm what kind of environment the medicine has been subjected to, and therefore, the above-mentioned situation has become a barrier against utilization promotion of the medicine for rare diseases (orphan drug) and the like.

A social role of the medicine for rare diseases (orphan drug) and the like as medicine effective for hardly curable intractable diseases is large, and an endeavor for promoting the utilization thereof regardless of the number of patients is required.

Therefore, the present invention aims to provide a medical cart with which it can be confirmed that individual medicines have been managed at appropriate temperatures.

SUMMARY

A medical cart according to one embodiment of the present invention includes shelves, on each of which medicines are placed, and the medical cart includes: an RF tag provided for the medicine and equipped with a temperature sensor; and a control part communicating with the RF tag via an antenna part provided in a vicinity of each of the shelves at appropriate time intervals, the control part having a memory part storing ID information of the RF tag and temperature information sensed by the temperature sensor of the RF tag.

Thus, the temperature of each of the individual medicines placed on the shelves of the cart can be recorded at appropriate time intervals, and a temperature history of each of the individual medicines can be confirmed. Therefore, it can be secured that temperature control for individual medicines have been made within an appropriate range in a medical institution or the like.

In the medical cart according to the above-described embodiment, the control part includes a position sensor, and the memory part can be caused to store position information sensed by the position sensor together with the ID information and the temperature information. Thus, not only the temperature history of each of the individual medicines but also a position history thereof can be confirmed, and positions to which each of the medicines has been conveyed can be confirmed in a follow-up manner.

In the medical cart according to the above-described embodiment, the control part can include a communication part capable of transmitting at least the ID information and the temperature information to a management terminal or cloud server provided outside. Thus, the temperature history of each of the medicines conveyed by the cart can be easily confirmed from the management terminal or cloud server provided outside. In addition, the temperature histories can also be stored in the management terminal or the cloud server.

The medical cart according to the above-described embodiment can be configured such that an upper limit temperature and a time limit are set for the control part, the control part detects that a temperature indicated by the temperature information is the upper limit temperature or more, and when a period of time during which the temperature indicated by the temperature information is the upper limit temperature or more has exceeded the time limit, the control part transmits, to the management terminal, abnormality information and cart ID information, which is assigned to each medical cart, to make notification. Thus, the management terminal can recognize as soon as possible that some of the medicines conveyed are in an abnormal state, thereby allowing deterioration of quality of the individual medicines to be prevented as far as possible.

The medical cart according to the above-described embodiment includes: a plurality of stages of the shelves; a plurality of the antenna parts, each of which is provided in a vicinity of each of the shelves; and light emitting parts, each of which is associated with each of the shelves, and the medical cart can be configured also such that an upper limit temperature and a time limit are set for the control part, the control part detects that a temperature indicated by the temperature information is the upper limit temperature or more, and when a period of time during which the temperature indicated by the temperature information is the upper limit temperature or more has exceeded the time limit, the control part causes any of the light emitting parts to emit light, the any of the light emitting parts being associated with any of the shelves for which any of the antenna parts is provided, the any of the antenna parts having received the temperature information indicating the temperature which is the upper limit temperature or more. Thus, it can be recognized that some of the medicines placed on the shelves are in an abnormal state, and which shelf or shelves the medicines having the occurrence of abnormality are placed on can be found out soon.

The medical cart according to the above-described embodiment can be configured such that the RF tag includes a processing part, a battery part, and a tag light emitting part emitting light by electrical power of the battery part, and when the temperature indicated by the temperature information, which exceeds the set upper limit temperature, is detected, the processing part causes the tag light emitting part to emit light. Thus, since it can be recognized by light emission by the tag light emitting part that the medicines have been subjected to a state in which the temperatures thereof exceed the upper limit temperature for a long time, in order to prevent deterioration of the medicines, coping with that state such as storing the medicines in the cold storage box can be soon made.

The medical cart according to the above-described embodiment can be configured such that the RF tag includes a processing part, a battery part, and at least two tag light emitting parts having light emission colors different from each other and emitting light by electrical power of the battery part, and the processing part causes one of the at least two tag light emitting parts to emit light. Thus, for example, by making settings such that a light emission color of one of the tag light emitting parts is red and a light emission color of the other of the tag light emitting parts is blue and causing the one of the light emitting parts to emit the red light for a medicine to be frozen and the other of the light emitting parts to emit the blue light for a medicine to be refrigerated, after conveying the medicines by the medical cart, the medicines can be housed into a refrigerator and a freezer and stored in a sorted manner without making any mistake between the refrigerator and the freezer.

The medical cart according to the above-described embodiment can be configured such that the medical cart includes a cold storage box capable of being placed on each of the shelves, and the cold storage box has: a storage part capable of housing the medicine; a cooling device capable of cooling the storage part; a box battery part causing the cooling device to operate; and a power receiving part receiving, when cold storage box is placed on any of the shelves, electrical power transmitted, by radio, from a power transmitting part provided for the medical cart, the power receiving part charging the box battery part. Thus, since the medicines which are stored in the cold storage box can be conveyed and when the cold storage box is placed on the cart, the battery part is charged, a cold insulation state can be kept.

DETAILED DESCRIPTION

Hereinafter, a medical cart according to one embodiment of the present invention will be described. However, the present invention is not limited to this embodiment.

Figure 1:
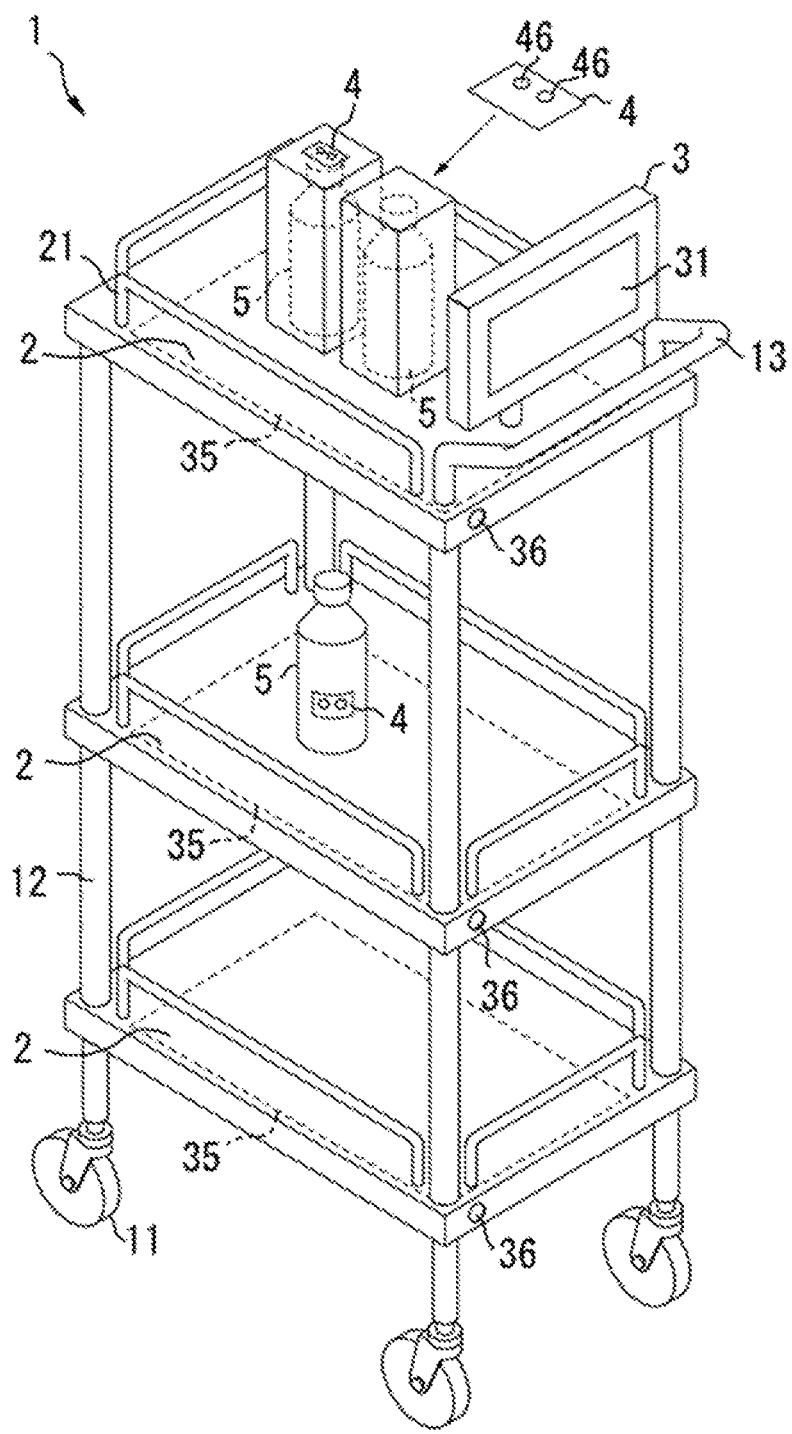
FIG. 1 is a perspective view showing a medical cart according to one embodiment of the present invention.
Figure 2:
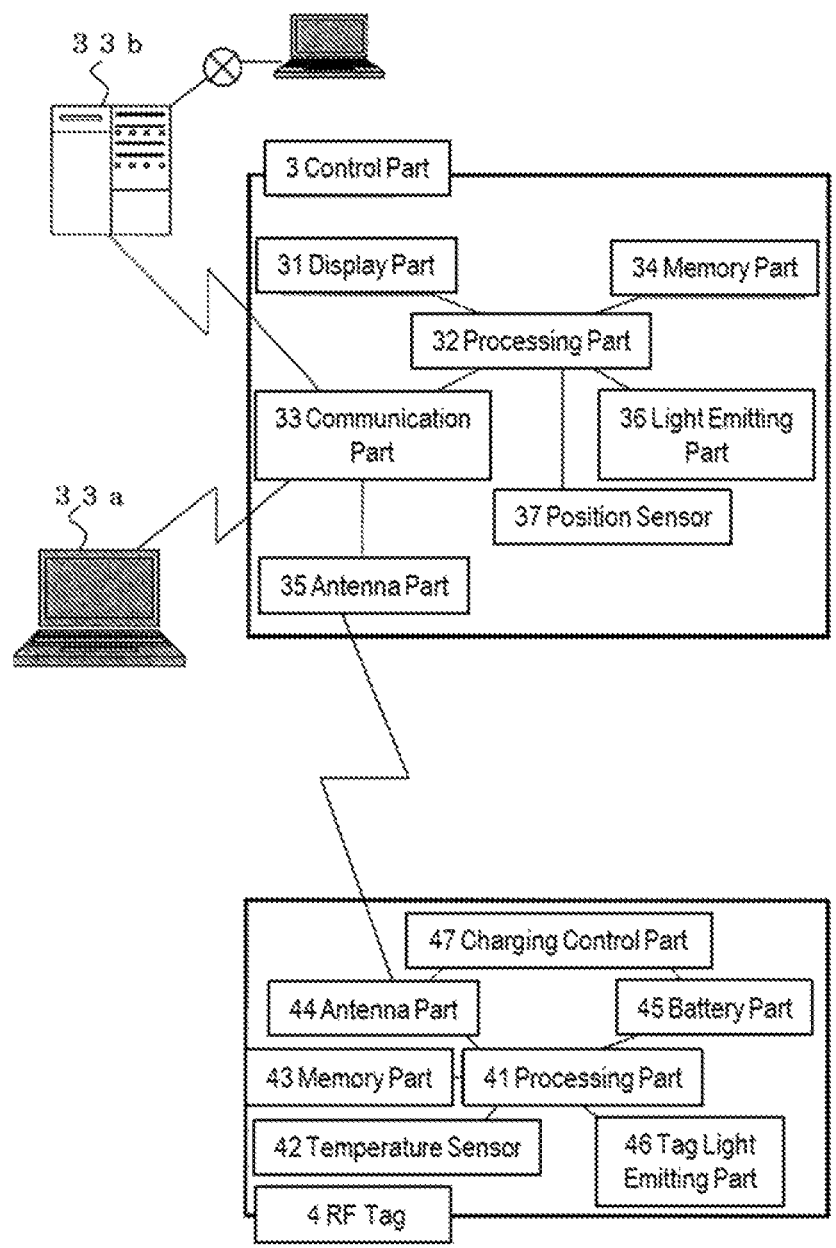
FIG. 2 is a diagram showing an example of a configuration of a control part or the like in the medical cart in FIG. 1.

As shown in FIG. 1 or FIG. 2, the medical cart 1 according to one embodiment of the present invention includes shelves 2 and a control part 3.

In the present embodiment, as shown in FIG. 1, the medical cart 1 includes four casters 11, and on cylindrical supporting columns 12 which respectively extend upward from the casters 11, the flat-plate-like shelves 2 are provided in such a way as to be spaced apart from one another in a vertical direction, and with medicines 5 or the like, each equipped with an RF tag 4, placed on the shelves 2, the medical cart 1 allows the medicines 5 to be conveyed. On a front side of the shelf 2 on an uppermost stage, a handle 13 which extends diagonally upward is provided, and by holding the handle 13, it is made easy to push and pull the medical cart 1.

Note that although each of the medicines 5 is not particularly limited, objects for which temperature control such as cold-insulation is required are cited, and for example, medicine for rare diseases (orphan drug), blood, blood products, and the like can be cited.

In the present embodiment, as shown in FIG. 1, each of the shelves 2 is formed in a rectangular flat plate shape, and the shelves 2 on three stages are provided in such a way as to be substantially equally spaced apart from one another in the vertical direction. On the periphery of each of the shelves 2, fence parts 21 which are made of a bar material are provided, thereby making the medicines 5 and the like placed on the shelves 2 hardly drop. Note that in the present invention, at least one shelf 2 on one stage may be provided.

In the present embodiment, as shown in FIG. 1, the control part 3 is provided on the front side of the shelf 2 on the uppermost stage, is supported by a cylindrical shaft, and is formed in a horizontally long rectangular shape, and as shown in FIG. 2, the control part 3 includes a display part 31, a processing part 32, a communication part 33, a memory part 34, antenna parts 35, light emitting parts 36, a position sensor 37, and the like. It is preferable that the control part 3 also has a function of a reader/writer of the RF tag 4.

In the present embodiment, the display part 31 is composed of a liquid crystal display in a horizontally long rectangular shape and displays a variety of pieces of information, thereby allowing ID information, temperature information, cart ID information, and the like transmitted from the RF tag 4 to be displayed and confirmed. It is preferable that the display part 31 is made to serve as operation buttons which allow a variety of operations to be performed, as a touch panel and the display part 31 allows a variety of settings of an upper limit temperature, a time limit for the upper limit temperature, and the like to be made.

The processing part 32 includes a CPU, performing operation processing, and the like and is capable of executing stored programs and of thereby performing information processing.

The communication part 33 is connected to each of the antenna parts 35 provided for the shelves 2 and can communicate with the RF tag 4. In addition, the communication part 33 can communicate with a management terminal 33a, a cloud server 33b, or the like which is provided outside. As the management terminal 33a, for example, a personal computer, a portable phone (smartphone), or the like can be used. The ID information, the temperature information, the cart ID information, and the like which are stored in the memory part 34 can be transmitted to the management terminal 33a, the cloud server 33b, or the like. It is preferable that communication with the management terminal 33a or the cloud server 33b is performed in conformity with a communication standard such as Bluetooth (registered trademark).

The memory part 34 is composed of a memory, a HD (hard disk), and the like and can store programs for executing the processing part 32 and pieces of information such as the temperature information, the ID information, the cart ID information, and position information.

Each of the antenna parts 35 can communicate with the RF tag 4 of each of the medicines 5 placed on the shelves 2, is provided in the vicinity of each of the shelves 2, and transmits radio waves at appropriate time intervals via each of the antenna parts 35 in response to an instruction from the control part 3, and the RF tag 4 receives the radio waves and replies the ID information and the temperature information to the control part 3.

Although in the present embodiment, each of the antenna parts 35 is provided on a back surface of each of the shelves 2, the present invention is not limited to this, and it is only required for each of the antenna parts 35 to be located in the vicinity of each of the shelves 2, and as far as each of the antenna parts 35 and the RF tag 4 of each of the medicines 5 placed on each of the shelves 2 can communicate with each other, each of the antenna parts 35 may be located in any position. For example, although a distance at which each of the antenna parts 35 and RF tag 4 can communicate with each other depends on a size of the medical cart 1, it is preferable that the distance is set to approximately 30 cm to 100 cm, and it is preferable that each of the antenna parts 35 is provided in a position where the RF tag 4 comes in this range when each of the medicines 5 is placed on each of the shelves 2. Note that the antenna parts 35 can be made of aluminum foil or the like.

Each of the light emitting parts 36 is made to emit light when sensing abnormality on each of the medicines 5 placed on each of the shelves 2 and is composed of LEDs or the like. Although in the present embodiment, each of the light emitting parts 36 is provided on an end surface on the front side of each of the shelves 2, as far as each of the light emitting parts 36 is provided in a position where each of the light emitting parts 36 is easily viewable, each of the light emitting parts 36 may be provided in any position. In addition, instead of providing the light emitting parts 36, sensing of the abnormality on each of the medicines 5 may be displayed on the display part 31.

Note that the antenna part 35 and the light emitting parts 36 are connected to the control part 3 in a wired or wireless manner.

The position sensor 37 is to detect a position of the medical cart 1 in a facility such as a hospital and for example, is made operable to detect a floor number and the position thereof via a line which is set up throughout an inside of the hospital. The position sensor 37 may have a function of a GPS or the like and may be thereby operable to detect a position indicated by, for example, latitude and longitude, and the position sensor 37 may has a function of an altimeter and may be thereby operable to detect the floor number of the facility.

In the present embodiment, as shown in FIG. 1, the RF tag 4 is formed to be a rectangular sheet-like and as shown in FIG. 2, the RF tag 4 includes, a processing part 41, a temperature sensor 42, a memory part 43, an antenna part 44, a battery part 45, tag light emitting parts 46, and the like.

As the RF tag 4, any of a passive tag, an active tag, a semi-active tag, and the like may be used.

The processing part 41 is to control the RF tag 4 and includes an IC and the like.

The temperature sensor 42 can sense an ambient temperature of the RF tag 4. The sensed temperature is stored as the temperature information in the memory part 34 of the control part 3 or the like.

The memory part 43 can store the temperature information, the ID information (unique ID), and the like and can be made operable to store a set upper limit temperature and the like.

The antenna part 44 is included to communicate with the control part 3. The RF tag 4 receives radio waves from the control part 3 via the antenna part 44 and transmits the radio waves to the processing part 41, and the processing part 41 can reply the temperature information, the ID information, and the like to the control part 3 via the antenna part 44.

The battery part 45 is to supply electrical power for driving the RF tag 4. When the RF tag 4 is the passive tag, no battery part 45 may be included. Although the battery part 45 may be an exchangeable type battery part using, for example dry-cell batteries, it is preferable that the battery part 45 is chargeable. For example, it is preferable that when the radio waves are received from the control part 3, the battery part 45 is made chargeable from the antenna part 44 via a charging control part 47, and the battery part 45 is invariably fully charged.

It is preferable that each of the tag light emitting parts 46 is composed of LEDs or the like and at least one light emitting part 46 is included. For example, an upper limit temperature is set on the RF tag 4, and when a temperature indicated by the temperature information exceeding this upper limit temperature is detected, the light emitting part 46 is caused to emit light, thereby enabling notification of the occurrence of the abnormality.

In addition, as shown in FIG. 1, two tag light emitting parts 46 can be provided, light emission colors of the tag light emitting parts 46 being made different from each other, and can be set such that one of the two tag light emitting parts 46 emits light. For example, by making settings such that a light emission color of one of the tag light emitting parts is red and a light emission color of the other of the tag light emitting parts is blue and causing the one of the light emitting parts to emit the red light for a medicine 5 to be frozen and the other of the light emitting parts to emit the blue light for a medicine 5 to be refrigerated, after conveying the medicines 5 by the medical cart 1, the medicines 5 can be housed into a refrigerator and a freezer and stored in a sorted manner without making any mistake between the refrigerator and the freezer.

Hereinafter, one example of a method of using the medical cart 1 is shown.

First, each of the medicines 5 is equipped with the RF tag 4. In this case, the RF tag 4 may be directly attached to a container of each of the medicines 5, and the container of each of the medicines 5 is put in a box or a case, the RF tag 4 may be attached onto the box or the case. It is only required for the RF tag 4 to be provided for each of the container of each of the medicines 5, and the RF tag 4 may be tied with a string and may be enclosed in a box and a case.

In the present example, a unique ID of the RF tag 4 is used as the ID information. It is preferable that the ID information is previously associated with a trade name of each of the medicines 5, which is provided with the RF tag 4, for example, in the management terminal 33a or the like. Note that in the present embodiment, description is made such that the ID information is composed of a 16-digit numerical value.

The control part 3 is set as described below.

The control part 3 is set such that the control part 3 communicates with the RF tag 4 provided for each of the medicines 5 via the antenna part 35 at appropriate time intervals and the temperature information sensed by the temperature sensor 42 is replied thereto from the RF tag 4. At this time, the ID information is also replied. Each of these time intervals can be set to, for example, each one minute, each five minutes, each ten minutes, each 20 minutes, or the like.

In addition, an individual cart ID is set for the medical cart 1. It is preferable that the cart ID is set as an appropriate number from the control part 3. In the present example, the cart ID is set as "0001".

The medicines 5 are placed on each of the shelves 2 and the medical cart 1 is moved, thereby allowing the medicines 5 to be conveyed. In the present example, two medicines 5 are placed on a third stage (uppermost stage) and one medicine 5 is placed on a second stage (middle stage).

At this time, the control part 3 transmits the radio waves via the antenna part 35 at appropriate time intervals and communicates with the RF tag 4 of each of the individual medicines 5 placed on the shelves 2. The RF tag 4 receives the radio waves via the antenna part 44 and replies the temperature information sensed by the temperature sensor 42 and the ID information. The replied pieces of information are received by the control part 3 via the antenna part 35 and are stored in the memory part 34 of the control part 3. The time at this time is also stored therein, and the position information acquired by the position sensor 37 can also be stored as needed.

Figures 3, 4:
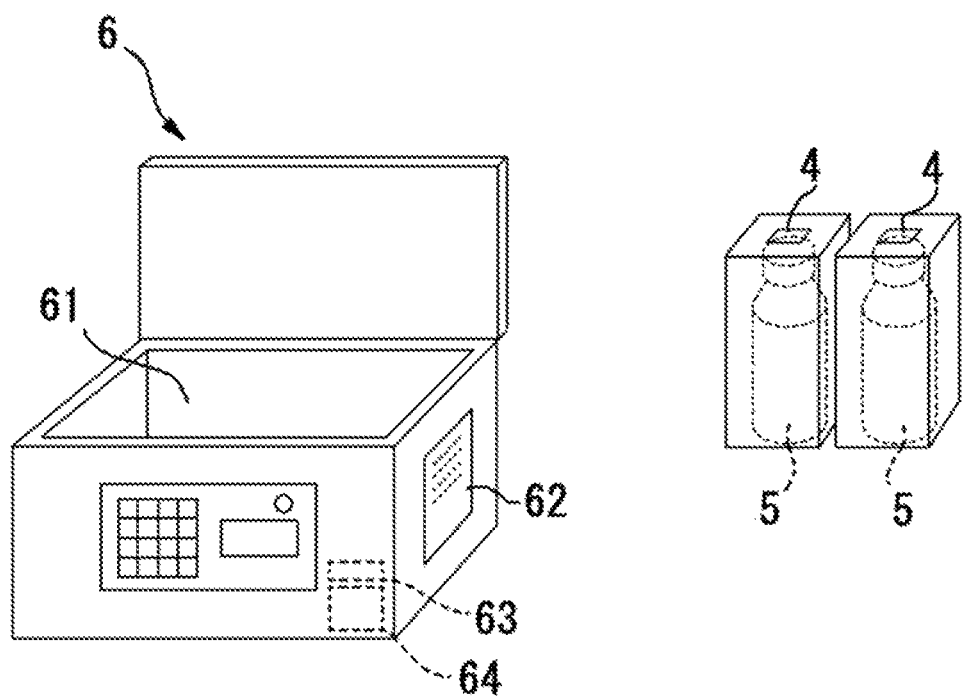
FIG. 3 is a table showing one example of temperature information and ID information stored in a memory part of the control part in the medical cart in FIG. 1.
FIG. 4 is a perspective view showing one example of a cold storage box which can be placed on the medical cart in FIG. 1.

In the memory part 34, for example, as shown in FIG. 3, the temperature information and the ID information are stored for each of the shelves 2. Note that in FIG. 3, a case in which the temperature information is detected at each interval of 10 minutes is shown, and each mark "−" in FIG. 3 indicates that no temperature information is detected.

In the memory part 34 of the control part 3, the temperature information, the time at which a temperature indicated by the temperature information is measured, and the position information as needed are stored for each ID information. Based on these pieces of information, the display part 31 is caused to display a temperature history, thereby allowing the temperature history of each of the medicines 5 on the medical cart 1 to be confirmed. In addition, communication with the control part 3 is performed from the management terminal 33a by radio or the like and the temperature information is transmitted via the communication part 33 of the control part 3, thereby also allowing the temperature history of each of the medicines 5 to be confirmed on the management terminal 33a. Furthermore, by transmitting the temperature information and the like to the cloud server 33b from the control part 3 via the Internet or the like to be stored therein, a personal computer, a mobile terminal, or the like is connected to the Internet or the like, and the temperature history of each of the individual medicines 5 can be thereby confirmed and managed from anywhere.

The upper limit temperature and the time limit can also be set for the control part 3, and the temperature information is cross-checked against the upper limit temperature and when a period of time during which a temperature indicated by the temperature information is the upper limit temperature or more has exceeded the time limit, abnormality information and the cart ID information are transmitted to the management terminal 33a or the like, thereby enabling notification and allowing on which cart the abnormality has occurred to be seen. This transmission of the abnormality information can be conducted by E-mail or the like. This upper limit temperature can be set to, for example, −10° C., 0° C., 5° C., or the like, and this time limit can be set to, for example, three minutes, five minutes, ten minutes, or the like.

Instead of the transmission of the abnormality information or together with the transmission of the abnormality information, when the period of time during which the temperature of the medicines 5 indicated by the temperature information is the upper limit temperature or more has exceeded the time limit, the light emitting part 36 provided for the control part 3 can be caused to emit light, and at this time, the light emitting part 36 associated with the shelf 2 on which the medicine 5, the temperature of which has exceeded the upper limit temperature, is placed is caused to emit light. Thus, it can be recognized that the abnormality has occurred in the medicine 5 and furthermore, on which shelf 2 the medicine 5 having the occurrence of abnormality is placed can be soon seen.

An upper limit temperature can be set for the RF tag 4, and when a temperature indicated by the temperature information stored in the memory part 43 has exceeded the upper limit temperature, the tag light emitting parts 46 can emit light. Thus, the occurrence of abnormality in the medicines 5, equipped with the RF tag 4, can be recognized from the outside. It is preferable that this upper limit temperature is set by causing the display part 31 or the like to display operation buttons and performing the setting from the control part 3, and the upper limit temperature can be set to, for example, −10° C., 0° C., 5° C., or the like.

The RF tag 4 can include the two tag light emitting parts 46 having light emission colors different from each other, and for example, the tag light emitting parts 46 having red and blue light emission colors are included, and sorting-out can be made, for example, such that the red light is emitted for a frozen product and the blue light is emitted for a refrigerated product. Thus, after having used the medicines 5, any mistake is hardly made upon housing the medicines 5 in a refrigerator and a freezer. It is preferable that these settings are made by causing the display part 31 to display the operation buttons.

The medicines 5 may be housed in a cold storage box 6 as shown in FIG. 4 and be placed on each of the shelves 2.

The cold storage box 6 includes a storage part 61 which can house the medicines 5, and the storage part 61 can perform cold-insulation at an appropriate temperature by a cooling device 62. In addition, the cold storage box 6 is formed such that the radio waves from the control part 3 toward the RF tag 4 can be transmitted.

It is preferable that the cold storage box 6 includes a box battery part 63 which causes the cooling device 62 to operate and a power receiving part 64 which can charge the box battery part 63. It is preferable that upon placing the cold storage box 6 on the shelf 2, electrical power which is transmitted from a power transmitting part (not shown) provided for the medical cart 1 is received by the power receiving part 64 by radio and the box battery part 63 can be charged with the received electrical power.

Thus, the medicines 5 can be conveyed in a state in which the medicines 5 are housed in the cold storage box 6 and can be conveyed in a state in which the medicines 5 are refrigerated or frozen. In addition, since when the cold storage box 6 is placed on the medical cart 1, the box battery part 63 is invariably charged, the cooling device 62 never stops, thereby allowing a cold-insulated state to be kept.

Figure 5:
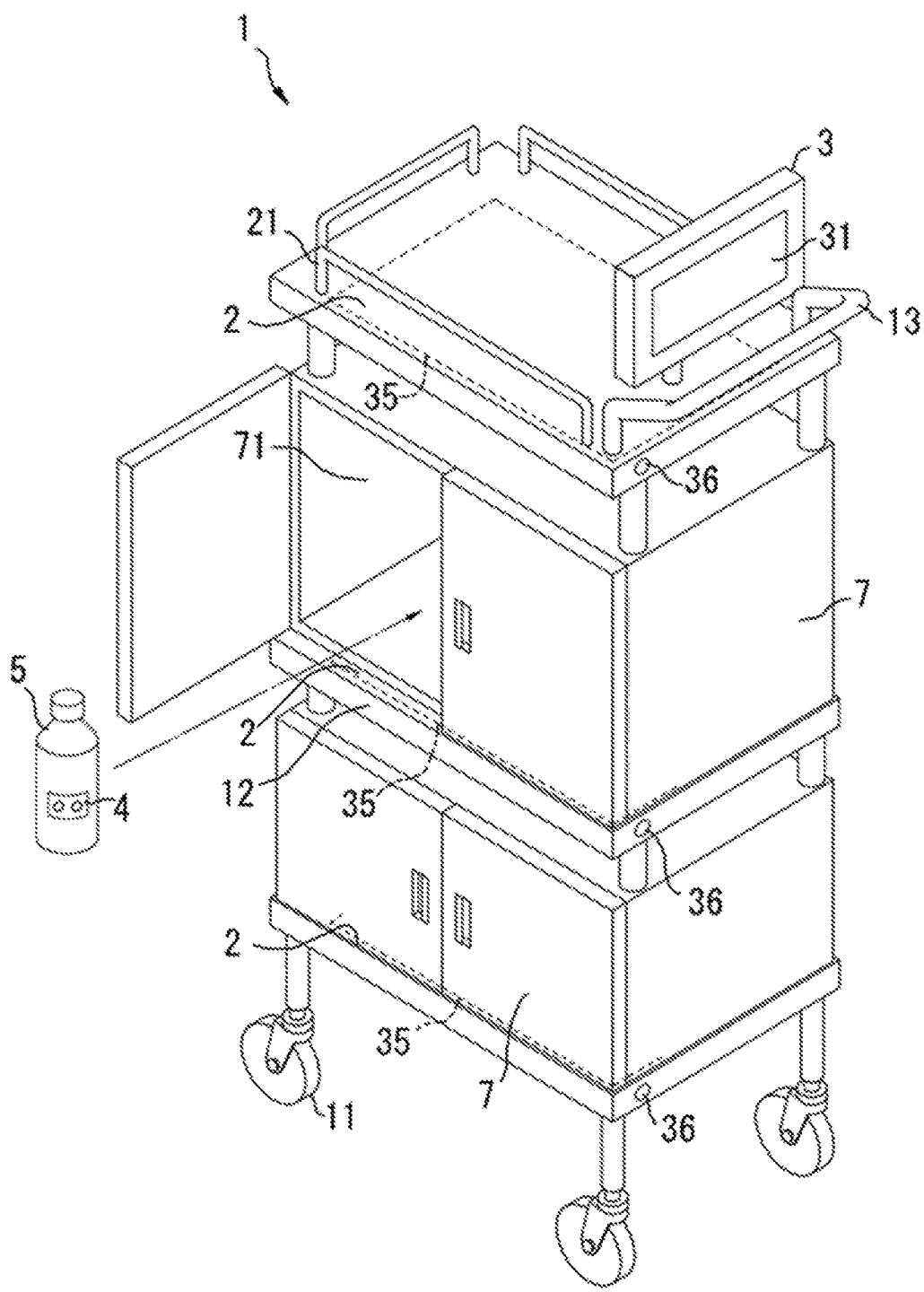
FIG. 5 is a perspective view showing a modified example of the medical cart in FIG. 1.

In FIG. 5, a modified example of the medical cart 1 is shown, and the medical cart 1 may include cold insulation cabinets 7 on the shelves 2. In the present example, the cold insulation cabinets 7 are provided on a first stage (lowermost stage) and a second stage (middle stage).

Each of the cold insulation cabinets 7 is configured such that by opening and closing a door thereof, the medicines 5 or the like can be housed in a storage part 71 inside the cold insulation cabinet 7 and a cold insulation state of the storage part 71 is kept by a cooling device. In addition, an RF tag 4 of each of the medicines 5 housed in the storage part 71 of the cold insulation cabinet 7 is made operable to perform communication in a state in which the medicines 5 are housed in the cold insulation cabinet 7. For example, an antenna part 35 is installed in the vicinity of a bottom of the storage part 71, and the antenna part 35 and a control part 3 are connected by a line, thereby allowing the antenna part 35 and the control part 3 to communicate with each other. Alternatively, the cold insulation cabinet 7 is made of a material which allows radio waves from the antenna part 35 in response to an instruction of the control part 3 to be transmitted, and the antenna part 35 is installed on a back surface of each of the shelves 2 or the like, thereby also enabling communication with the RF tag 4 of each of the medicines 5 housed in the cold insulation cabinet 7.

Thus, the medicines 5 in a refrigerated or frozen state can be conveyed, hence allowing temperature histories to be managed while deterioration of the medicines 5 is minimized.

As described above, by employing the medical cart 1, upon conveyance in a medical institution such as a hospital, the temperature histories of the medicines 5 are stored in the memory part 34 and can be confirmed on the display part 31, the management terminal 33a, or the like, and it can be confirmed that the medicines 5 have been managed at the appropriate temperatures.

The invention claimed is:

1. A medical cart including a plurality of shelves, on each of which a medicine is placeable, the medical cart comprising:

a temperature sensor provided for the medicine, the temperature sensor being configured to detect a temperature of the medicine;

an RF tag provided for the medicine, the RF tag including a first memory, the first memory being configured to store ID information and temperature information of the medicine, the temperature information corresponding to the detected temperature of the medicine by the temperature sensor;

a control device configured to communicate with the RF tag via an antenna provided in a vicinity of each of the plurality of shelves at predetermined time intervals to obtain the ID information and the temperature information from the RF tag, the control device having a second memory that is configured to store the ID information and the temperature information; and a display configured to display the ID information and the temperature information.

2. The medical cart according to claim 1,
wherein the control device further includes a position sensor, and the position sensor is configured to detect a position of the medical cart, and
the second memory is configured to store position information corresponding to the detected position by the position sensor together with the ID information and the temperature information.

3. The medical cart according to claim 1,
wherein the control device further includes a communication device that is configured to transmit at least the ID information and the temperature information to a management terminal or cloud server provided outside.

4. The medical cart according to claim 3,
wherein the control device is configured to set an upper limit temperature and a time limit, and the control device is configured to determine whether the detected temperature indicated by the temperature information is equal to or more than the upper limit temperature and whether a period of time, during which the temperature is equal to or more than the upper limit temperature, exceeds the time limit, and
the control device is configured to transmit abnormality notification and cart ID information assigned to the medical cart to the management terminal when the control device determines that the period of time has exceeded the time limit.

5. The medical cart according to claim 1, comprising:
the plurality of shelves including a first shelf on which the medicine is placed;

a plurality of the antennas, each of which is provided in the vicinity of each of the plurality of shelves, the plurality of the antennas including a first antenna provided in the vicinity of the first shelf; and a plurality of light emitting devices, each of which is associated with each of the plurality of shelves, the plurality of light emitting devices including a first light emitting device associated with the first shelf, wherein the control device is configured to set an upper limit temperature and a time limit, and the control device is configured to determine whether the detected temperature indicated by the temperature information is equal to or more than the upper limit temperature and whether a period of time, during which the temperature is equal to or more than the upper limit temperature, exceeds the time limit, and the control device is configured to cause the first light emitting device to emit light when the control device determines, by communicating with the RF tag via the first antenna, that the period of time has exceeded the time limit.

6. The medical cart according to claim 1,
wherein the RF tag includes a processing circuit, a battery, and a tag light emitting device emitting light by electrical power of the battery, and
when the detected temperature indicated by the temperature information exceeds a predetermined upper limit temperature, the processing circuit is configured to cause the tag light emitting device to emit the light.

7. The medical cart according to claim 1,
wherein the RF tag includes at least two tag light emitting devices having light emission colors different from each other.

8. The medical cart according to claim 1, further comprising a cold storage box that is placeable on one of the plurality of shelves,
wherein the cold storage box is configured with:
a storage housing the medicine therein;
a cooling device configured to cool an inside of the storage;
a box battery configured to cause the cooling device to operate; and
a power receiver configured to receive, when cold storage box is placed on one of the plurality of shelves, electrical power transmitted, by radio, from a power transmitter provided at the medical cart, and the power receiver is configured to charge the box battery.

\* \* \* \* \*